(12) United States Patent
Ramaswamy et al.

(10) Patent No.: US 12,380,146 B1
(45) Date of Patent: Aug. 5, 2025

(54) MULTI-CHANNEL, INTELLIGENT CONVERSATIONAL AGENT

(71) Applicant: 32Health Inc., Brookline, MA (US)

(72) Inventors: Deepak Ramaswamy, Newton, MA (US); Ravindra Kompella, Hyderabad (IN); Shaju Puthussery, Brookline, MA (US); Sagala Chaithanya Kumar, Hyderabad (IN)

(73) Assignee: 32Health Inc., Brookline, MA (US)

( * ) Notice: Subject to any disclaimer, the term of this patent is extended or adjusted under 35 U.S.C. 154(b) by 0 days.

(21) Appl. No.: 18/917,866

(22) Filed: Oct. 16, 2024

(51) Int. Cl.
*G06F 40/40* (2020.01)
*G06F 16/334* (2025.01)
*G06F 16/36* (2019.01)
*H04L 51/04* (2022.01)

(52) U.S. Cl.
CPC ........ *G06F 16/3344* (2019.01); *G06F 16/367* (2019.01); *H04L 51/04* (2013.01)

(58) Field of Classification Search
CPC .......... G06F 40/30; G06F 40/40; G06F 40/20; G06F 16/532; G06F 16/3329; G06F 16/345; G06F 16/3344; G06F 40/205; G06F 40/279; G06F 16/245; G06F 16/248; G06F 16/334; G06F 40/284; G06F 40/295
See application file for complete search history.

(56) References Cited

U.S. PATENT DOCUMENTS

| | | | |
|---|---|---|---|
| 11,978,273 B1 * | 5/2024 | Ramaswamy | G06V 10/82 |
| 12,135,740 B1 * | 11/2024 | Yu | G06F 16/3329 |
| 2022/0115100 A1 * | 4/2022 | Barve | G16H 10/60 |
| 2023/0149135 A1 * | 5/2023 | Lipnik | A61C 9/0053 |
| | | | 433/214 |
| 2023/0162831 A1 * | 5/2023 | Subramanian | G16H 20/10 |
| | | | 705/3 |
| 2023/0274086 A1 * | 8/2023 | Tunstall-Pedoe | G06F 40/20 |
| | | | 704/9 |
| 2024/0070434 A1 * | 2/2024 | Garg | G06N 3/0455 |
| 2024/0265281 A1 * | 8/2024 | Hart | G06F 40/58 |
| 2024/0281891 A1 * | 8/2024 | Fields | G06Q 40/08 |
| 2024/0339217 A1 * | 10/2024 | Bui | G16H 50/20 |
| 2024/0387025 A1 * | 11/2024 | Shah | G10L 15/22 |

* cited by examiner

*Primary Examiner* — Olujimi A Adesanya
(74) *Attorney, Agent, or Firm* — Polsinelli PC (57) ABSTRACT

The disclosure relates to systems, methods, and computer-readable media for an artificial intelligence (AI) conversational agent configured for enhanced user interaction in multi-channel contact centers. An example method includes receiving a query regarding a particular property of an asset during a real-time conversation, classifying an intent of the query into a predefined category, triggering, based on the classifying of the intent, a finetuned large language model for the predefined category to answer the query, generating, by the finetuned large language model, a response to the query based on at least one of an information data model and a knowledge graph data store, and outputting the response to the query.

20 Claims, 8 Drawing Sheets

MULTI-CHANNEL, INTELLIGENT CONVERSATIONAL AGENT

BACKGROUND

The healthcare industry includes many complexities that are difficult for lay persons to navigate. For example, many insurance providers offer tens or hundreds of thousands of different insurance plans. As a result, customers often call their providers to ask and determine such details of their plans. Due to the complexities of the various plans, agents of the providers need to have significant amounts of training. In addition, there is a trend of high turnover of agents, which further exacerbates the amount of training that is done on a consistent basis.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

The healthcare industry includes many complexities that are difficult for lay persons to navigate. For example, many insurance providers offer tens or hundreds of thousands of different insurance plans. Each plan can differ by having different benefits, coverage, premiums, and other aspects. The sheer volume of different factors that may vary between plans can cause laypersons to have difficulties understanding the details of their own plans. As a result, customers often call their providers to ask and determine such details of their plans.

Due to the complexities of the various plans, agents of the providers need to have significant amount of training. For example, each agent needs to be trained to understand the nuances of each plan and ensure that the agent is conveying the correct information for each customer. In addition, there is a trend of high turnover of agents, which further exacerbates the amount of training that is done on a consistent basis. This results in situations that can leave customers frustrated and discontent.

While there are some automated conversational agents, many of these systems are rule-based systems that are rigid and may provide a less human-like experience. Additionally, many of these systems can result in inaccurate and even irrelevant answers and/or interactions.

The present technology provides solutions for efficiently providing personalized customer care and information using a conversational artificial intelligence (AI) agent. For example, the conversational AI can be a conversational AI agent system that is configured to use finetuned machine learning (ML) models to address customer queries through a variety of mediums. For example, a customer can ask the conversational AI agent system through phone calls, video calls, chat functions, and other similar mediums. In some embodiments, responses may also be tailored based on communication methods or mediums. The finetuned machine learning models can be finetuned large language models (LLMs) that are trained to answer specific questions associated with the more than hundreds of thousands of different plans. For example, the finetuned machine learning models can be finetuned using data associated with plans for dental, vision, hearing, medical, and other healthcare industries.

The conversational AI agent system can be configured to recognize intents of the questions and queries of the customers and classify the intents into pre-defined categories. The classified intents can then be used to trigger LLMs that are finetuned for the pre-defined category. The LLMs may utilize retrieval-augmented generation (RAG) and LangChains, all of which can leverage data stored in an information data model and/or knowledge graph data stores. For example, RAG combines information retrieval (e.g., obtaining existing or stored information) with text generation (e.g., creating new or additional information), where relevant information is retrieved from the knowledge base and used to augment an input to an LLM or other language model(s). The responses then generated by the conversational AI agent system are richer, more accurate, and more contextually relevant compared to the traditional automated systems.

Figure 1A:
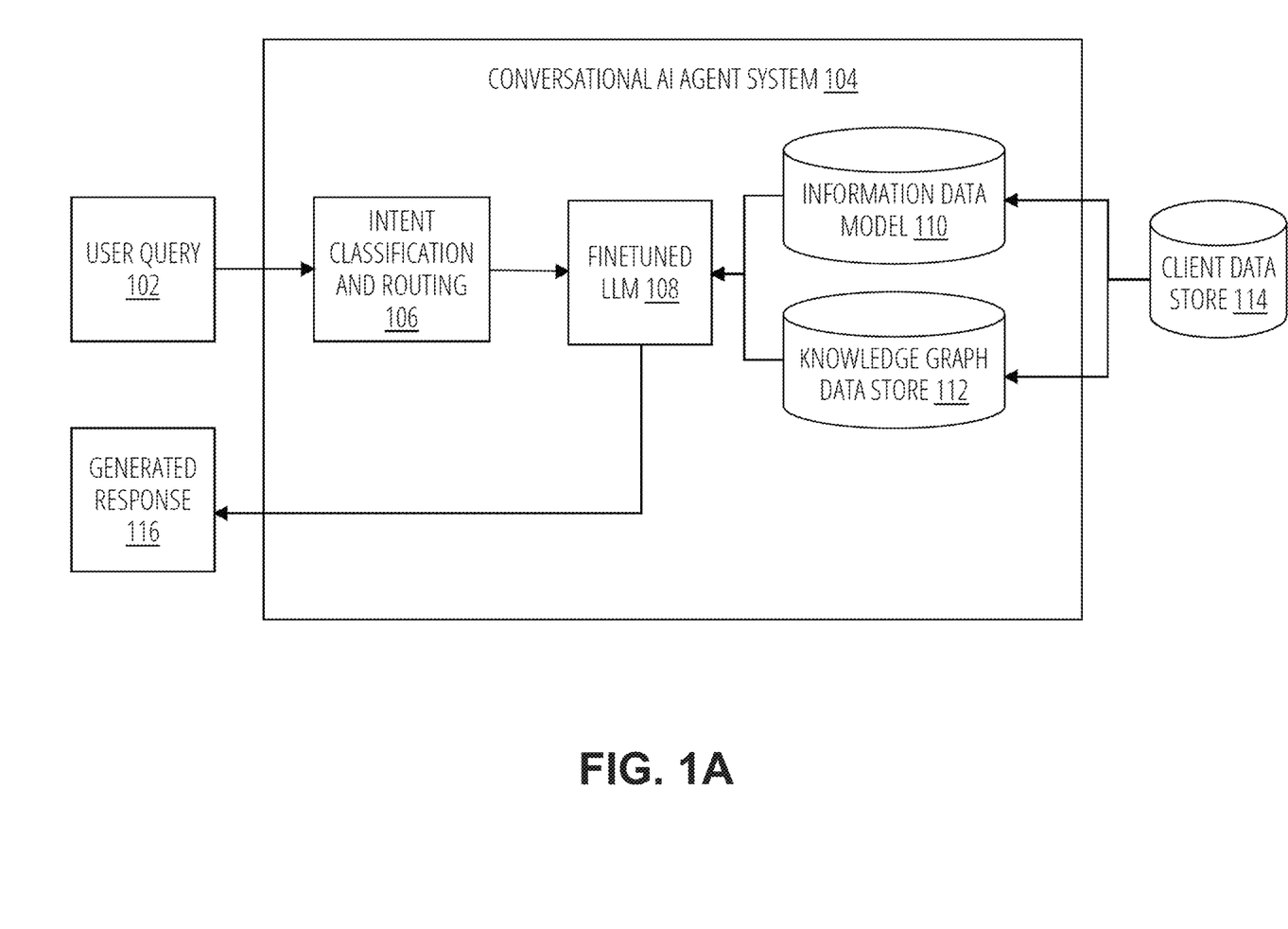
FIG. 1A illustrates an example conversational artificial intelligence (AI) agent system receiving a user query, in accordance with some aspects of the present technology.

Turning now to the figures, FIG. 1A illustrates a conversational AI agent system 104 receiving a user query 102. The conversational AI agent system 104 can include various processes and modules to receive and process user query 102 and subsequently provide a generated response 116. For example, conversational AI agent system 104 can include intent classification and routing 106, a finetuned LLM 108, information data model 110, knowledge graph data store 112, and client data store 114. In some aspects, the knowledge graph data store 112 can be used to store, retrieve, obtain, etc., one or more knowledge graphs for use by the conversational AI agent system 104, including knowledge graphs such as the example knowledge graph 150 of FIG. 1B, described in further detail below.

User query 102 can be a question that a user or customer asks the conversational AI agent system 104. For example, a customer may desire to learn more about what benefits are included with their plan. The customer can communicate with the conversational AI agent system 104 to ask (e.g., as a query) what benefits are included with their plan. The user query 102 can be communicated to the conversational AI agent system 104 across various communication methods or channels including, but not limited to, text, voice, etc.

Intent classification and routing 106 includes classifying incoming user queries based on chat or conversational intents. Conversational AI agent system 104 can utilize natural language processing techniques and machine learning models to accurately determine user intents and guide the query's routing to the appropriate response mechanisms or LLMs (e.g., a particular finetuned LLM 108). In some embodiments, the system is trained with a comprehensive set of phrases. The phrases can cover a wide array of potential user queries, enabling the system to classify intents more effectively and respond accurately across various user interactions. For example, the phrases can be historical phrases previously asked to live agents. In some examples, the phrases can be asked to previous iterations of the conversational AI agent system (e.g., continued training, etc.)

In some embodiments, the system can incorporate a learning mechanism that updates its intent classification efficiency. The misclassified intents can be added back to training phrases for the system to continuously learn. While extracting entities (e.g., health procedures, coverage policies, patient benefits, associated healthcare terms, etc.) from user questions is crucial, making the system adaptive to recognize new entities over time or entities mentioned in unusual contexts can improve understanding and response accuracy. For example, automated extraction of entities from conversation history can enable any new entities and/or synonyms to be added to the existing entities. This can also improve certain phrases during speech-to-text transcription. The intent recognition and strategic management of vocabulary and training phrases enable the system to maintain high accuracy in intent classification and, subsequently, response generation by adapting continuously to new user data and interaction trends.

In some embodiments, the system can include vocabulary management for enhanced speech-to-text accuracy. For example, the system can incorporate synonyms and entities into its vocabulary, which improves speech-to-text conversion and aids in accurately transcribing terms that may be specifically relevant to healthcare and insurance. In some embodiments, the system can further improve transcription accuracy by boosting phrases and words related to healthcare that may be phonetically similar to other non-healthcare or less relevant phrases, which can assist in distinguishing between similar-sounding terms and improve the likelihood that the speech-to-text system captures the correct terminology (e.g., in complex auditory environments, etc.).

In some embodiments, the system can be configured to have adaptive response mechanisms using conditional logic. For example, the system can generate varied responses based on a communication channel (e.g., text, voice, video, etc.) the user is interacting through. This adaptability optimizes responses for clarity and effectiveness based on the method of interaction. For example, each channel may have unique characteristics or limitations (e.g., short messaging service (SMS) vs. e-mail vs. voice), so the system can adapt responses to fit the specific context and user expectations for each method of communication. The adaptability provides advanced operational flexibility and user-centric design to dynamically generate human-like responses across different communication channels.

Finetuned LLM 108 can be one or more LLMs finetuned for user interaction in contact centers in the healthcare domain. For example, the finetuned LLM 108 can be finetuned to align with unique domain requirements and data specificities of healthcare contact centers, such as particular language and biases towards words and/or phrases commonly used in a healthcare context. The finetuned LLM 108 be integrated with the LangChain framework to generate contextually appropriate responses by integrating structured data and real-time information into the generation process. The finetuned LLM 108 can also leverage the retrieval capabilities of a vector retriever for retriever-augmented generation (RAG) to produce relevant and precise answers. In some embodiments, the finetuned LLM 108 is finetuned using a response-style instruction-based finetuning and domain-specific adaptations to improve handling of specialized queries.

In some embodiments, a prepared prompt is fed into the finetuned LLM 108, which processes the query considering contextual information provided. Finetuned LLM 108 is configured to generate a response, which is then delivered to the user to answer the query based on the specific user plan and general domain knowledge, both of which can be injected into the prompt that is provided to finetuned LLM 108 as discussed in further detail below.

Information data model 110 can act as an intermediary layer that structures and standardizes data from various sources before data is processed by the AI/ML models. The information data model 110 improves the efficiency of the response generation process by ensuring that data used in generation responses is conversation and response-aligned, while also being readily accessible. Various schema modeling techniques, such as the customized information model 510 discussed in further detail below, can be used to design information data model 110 as an intermediary data store that structures complex and diverse data into a format that is readily accessible and actionable by finetuned LLM 108. The information data model 110 bridges raw data and operational logic of an AI, which enables faster retrieval and more accurate interpretation of user queries.

Knowledge graph data store 112 can be used additionally or alternatively to information data model 110. Knowledge graph data store 112 organizes complex data sets using a network of linked data entities and relationships, and as noted above, can be used to store, retrieve, obtain, etc., one or more knowledge graphs for use by the conversational AI agent system 104, such as the example knowledge graph 150 illustrated in FIG. 1B. Knowledge graphs can represent complex relationships between data entities such as health procedures, coverage policies, patient benefits, and associated healthcare terms. Healthcare ontology can define the types of entities and possible relationships there between, which facilitates the effective organization and retrieval of information.

Figure 1B:
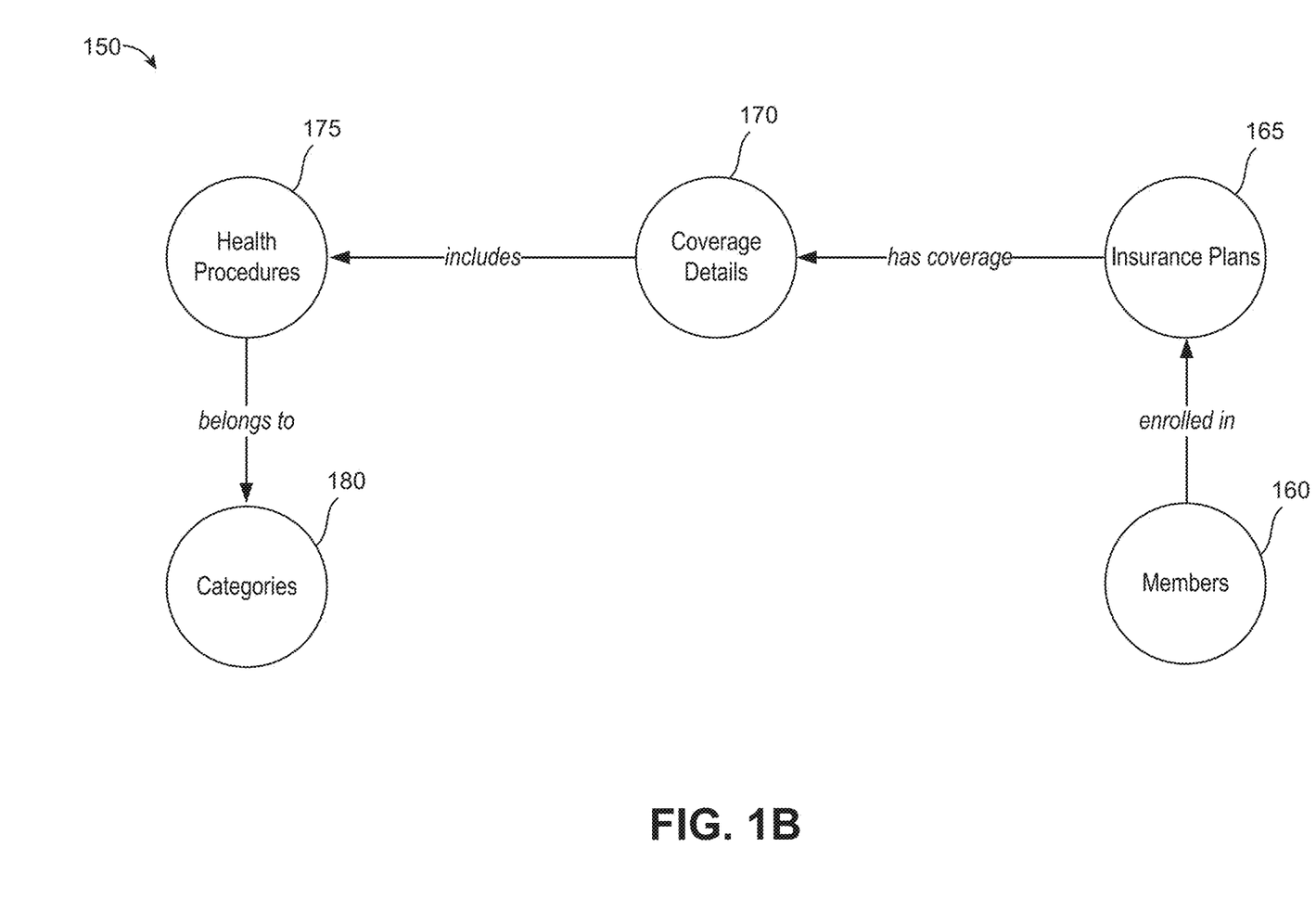
FIG. 1B illustrates an example of a knowledge graph that can be associated with and/or utilized by the conversational AI agent system of FIG. 1A, in accordance with some aspects of the present technology.

For example, the knowledge graph 150 corresponds to various entities each represented as a node within the knowledge graph 150 (e.g., node 160, corresponding to a 'Members' entity; node 165, corresponding to an 'Insurance Plans' entity; node 170, corresponding to a 'Coverage Details' entity; node 175, corresponding to a 'Health Procedures' entity; and node 180, corresponding to a 'Categories' entity; etc.). The knowledge graph 150 can be implemented as a structured representation of information to capture entities, attributes of the entities, and/or relationships between various ones of the entities. For example, entity attribute information can be stored in association with the corresponding node for a particular entity. The relationships between various entities can be represented or encoded within the edges of the knowledge graph 150 (e.g., the connections or interconnections between various nodes). For example, the Members entity 160 is connected to the Insurance Plans entity 165 by an edge that represents an enrollment relationship (e.g., which insurance plan(s) a member is enrolled in). The Insurance Plans entity 165 is connected to the Coverage Details entity 170 by an edge that represents a coverage relationship (e.g., details of the coverage provided by an insurance plan). The Coverage Details entity 170 is connected to the Health Procedures entity 175 by an edge that represents a relationship specifying the specific health procedures that are covered (or not covered) under the coverage details of an insurance plan. The Health Procedures entity 175 is connected to the Categories entity 180 by an edge that represents a categorization relationship, classifying each health procedure as belonging to one or more predefined categories, etc.

Data retrieval using knowledge graphs (e.g., such as the example knowledge graph 150 of FIG. 1B, etc.) can provide several benefits. Knowledge graphs allow the system to access a broader and more interconnected context than traditional linear data storage methods, and for example can enable the conversational AI agent system 104 to better anchor its outputs in factual knowledge (e.g., based on the knowledge graph 150 or other knowledge graph from the knowledge graph data store 112 providing a consistent and stable reference to maintain coherent and more easily updatable information, etc.). The relationships encoded within or represented by the edges and connections between the nodes/entities of the knowledge graph 150 can additionally improve the ability of the conversational AI agent system 104 to perform question answering and other tasks that benefit from improved explainability (e.g., based on the use of knowledge graph 150 corresponding to better explainability based on using the relationships of the edges/connections between nodes/entities for tracing the source(s) of information in the outputs of the conversational AI agent system 104, etc.).

These capabilities are helpful for responding effectively to impromptu questions, where the user may need detailed information involving multiple relational entities. For example, queries about the specifics of coverage for a particular type of health procedure can be addressed more thoroughly as the knowledge graph links various related aspects, such as procedure codes, coverage limits, and applicable conditions, etc. In the example of the knowledge graph 150 of FIG. 1B, queries about the specifics of coverage for a particular type of health procedure can be analyzed based on or otherwise using the information associated with the coverage details entity/node 170, the health procedures entity/node 175, and the edge therebetween that represents the relationship(s) between specific health procedures and specific coverage details. In some embodiments, the system can also employ an LLM specifically trained to generate cypher queries based on the input of a user. This leverages the model's understanding of natural language and its ability to formulate queries that precisely target relevant nodes and paths within the knowledge graph. The LLM model can analyze queries to determine the most relevant nodes and paths within the knowledge graph (e.g., such as knowledge graph 150 of FIG. 1B, and/or various other knowledge graphs associated with or stored within the knowledge graph data store 112 of FIG. 1A, etc.) and generate a cypher query that captures the essence of the user request. This query can then be executed against the knowledge graph to retrieve direct information requested and related data that can provide additional context and/or clarification. The additional information makes the responses more comprehensive and can address both the explicit and implicit aspects of a user question.

Client data store 114 contains the data from the healthcare domain that pertains to members, providers, health insurance claims, and health plan information belonging to a client organization. Client data store 114 can be used to integrate client-specific data stores or databases that contain historical and transactional data relevant to the user queries.

Generated response 116 is the response provided by conversational AI agent system 104 to the user query 102, as generated using finetuned LLM 108 and the various other processes and modules. The generated response 116 can be conveyed to the user via the same communication channel the user used to send the user query 102.

Figure 2:
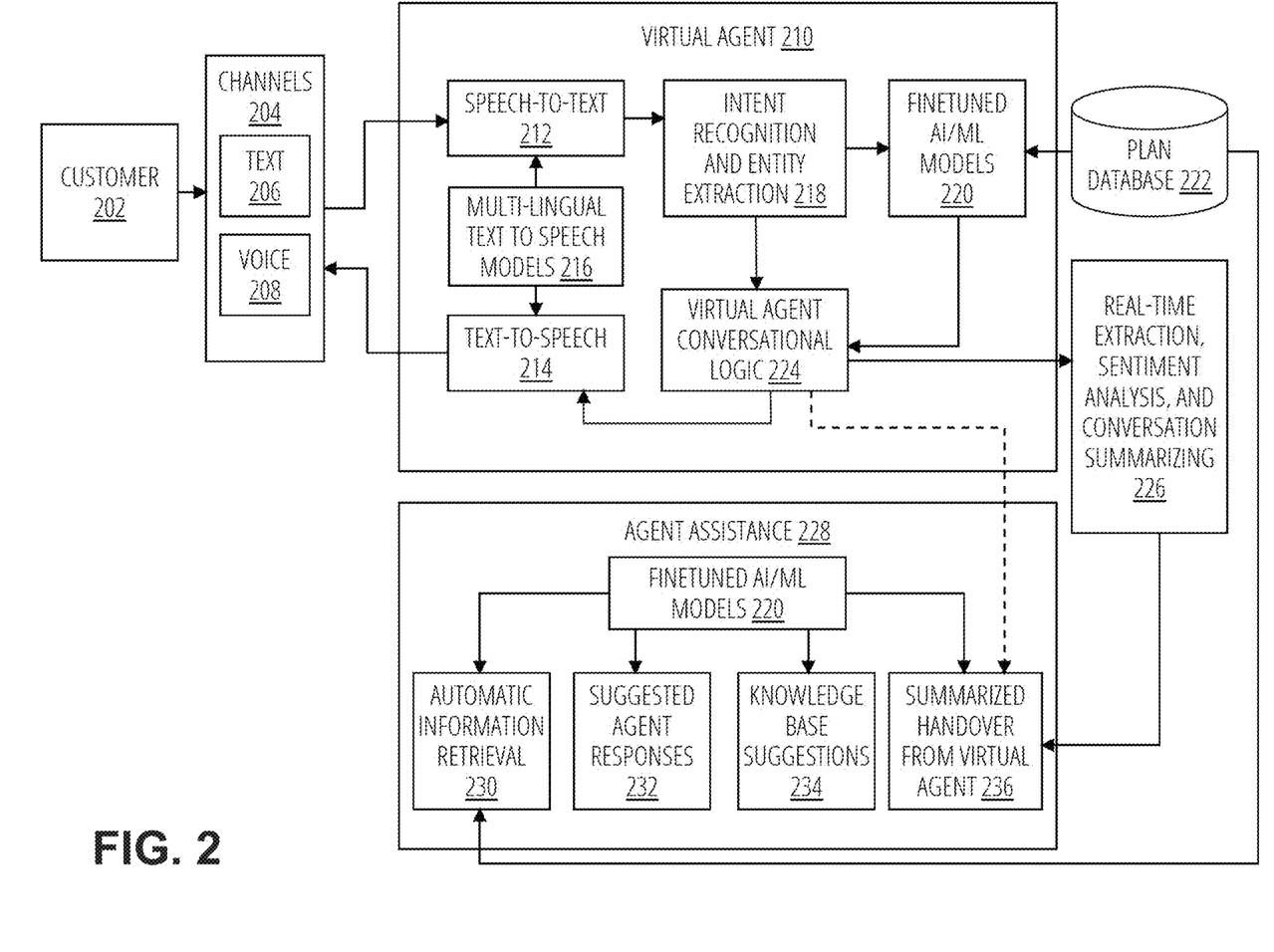
FIG. 2 illustrates an example virtual agent, in accordance with some aspects of the present technology.

FIG. 2 illustrates a virtual agent 210 (e.g., a conversational AI agent system) that can operate alongside an agent and/or provide agent assistance 228 to address a question from a customer 202 having a conversation with the virtual agent 210 through one or more communication channels 204, which can be a text channel 206, a voice channel 208, or other communication mediums.

Virtual agent 210 can include various processes and modules including, but not limited to, speech-to-text 212, text-to-speech 214, multi-lingual text to speech models 216, intent recognition and entity extraction 218, finetuned AI/ML models 220, plan database 222, virtual agent conversational logic 224, real-time extraction, sentiment analysis, and conversation summarizing 226.

Multi-lingual text to speech models 216 can provide speech-to-text 212 and text-to-speech 214 functionalities to interpret queries and generate responses in the language that a customer uses to ask a question.

After converting the query to a medium that is understood by the virtual agent 210, the virtual agent perform intent recognition and entity extraction 218. This can include classifying an intent of the query into pre-determined categories and identifying relevant entities associated with the pre-determined categories. For example, the virtual agent 210 may determine that a customer is asking a question having an intent about insurance coverage for a wisdom tooth and classify the question and/or intent in a dental coverage category.

Finetuned AI/ML models 220 is configured to process data from plan database 222 based on the intent and extracted relevant entities and provide the relevant data to virtual agent conversational logic 224. For example, extracted relevant entities for the above wisdom tooth example may include dental benefits, wisdom tooth procedures, and other similar and/or related entities.

Virtual agent conversational logic 224 is configured to receive the classification, relevant entities, and relevant data from finetuned AI/ML models 220. The virtual agent conversational logic 224 is also configured to generate a response that sounds natural and human-like by leveraging natural language processing models. In some embodiments, the response may require text-to-speech 214 conversion (e.g., using multi-lingual text to speech models 216) to be appropriately communicated through voice channel 208.

The virtual agent can also perform real-time extraction, sentiment analysis, and conversation summarizing 226. For example, the virtual agent 210 can extract relevant entities in real-time, analyze intents and sentiments, and generate summaries of the conversation thus far.

Additionally, the virtual agent 210 (e.g., by leveraging finetuned AI/ML models 220) can provide agent assistance 228, which can include automatic information retrieval 230, suggested agent responses 232, knowledge base suggestions 234, and summarized handover 236. For example, finetuned AI/ML models 220 can assist in retrieving information as the agent and/or customer converse. As another example, finetuned AI/ML models 220 can generate suggested agent responses 232 to alleviate the workload on agents. As another example, finetuned AI/ML models 220 can provide knowledge base suggestions based on words or phrases that are relevant to the conversation.

In some situations, the virtual agent 210 may need to fall back to an agent. The virtual agent 210 can (e.g., using virtual agent conversational logic 224) generate a summarized handover to provide the agent with information that has already been provided, extracted, and/or determined during the course of the conversation.

Figure 3:
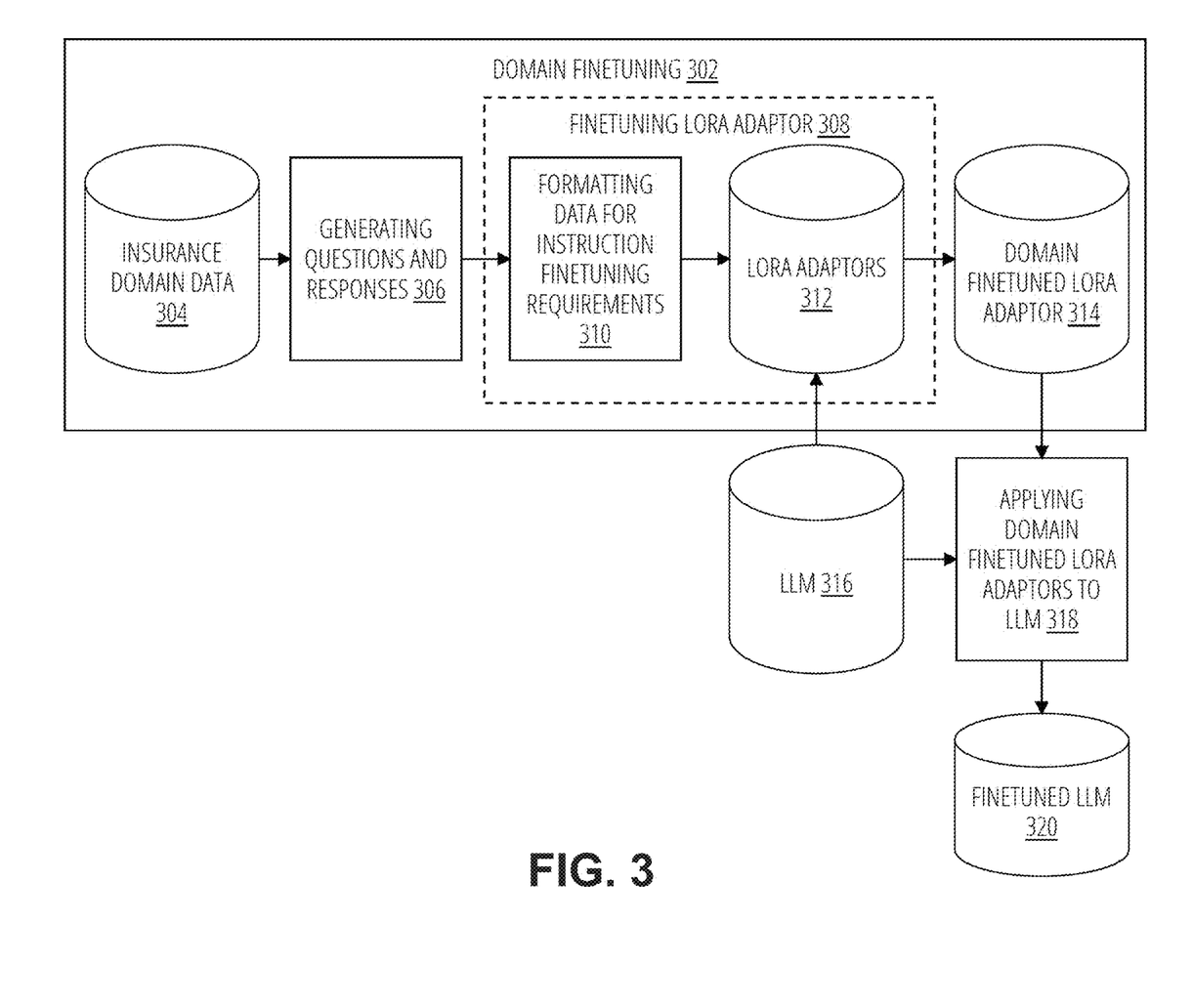
FIG. 3 illustrates example aspects for domain finetuning of an LLM, in accordance with some aspects of the present technology.

FIG. 3 illustrates aspects for domain finetuning 302 of an LLM 316 (e.g., an open source LLM). Domain finetuning 302 an LLM can include utilizing insurance domain data 304, generating questions and responses 306, finetuning Low-Ranking Adaptation (LORA) adaptor 308, and domain finetuned LORA adaptors 314. Additionally, the domain finetuning 302 can utilize and apply 318 the domain finetuned LORA adaptor 314 to the LLM 316 to generate a finetuned LLM 320.

Insurance domain data 304 can include domain-specific data collected from various healthcare domain sources, such as official notices from organizations and associations, guides, brochures, etc.

Generating questions and responses 306 includes formulating a wide variety of questions that the user typically queries from the system. Templates are created and mapped to questions, allowing the generation of filled responses. These filled response templates guarantee the standardization of responses across a wide variety of different phrasings of similar questions. In some embodiments, the system augments the generated questions and responses by paraphrasing existing questions and responses to generate an even more diverse set of questions and responses.

Finetuning LORA adaptor 308 can include formatting data 310 and a data store of LORA adaptors 312. Formatting data 310 includes formatting data according to specific requirements for instruction finetuning to generate domain finetuned LORA adaptors 314 from LORA adaptors 312. For example, this can involve structuring the data to align with the prompting format of the selected LLM being finetuned. In some embodiments, this can be one single finetuned adaptor made on an entire finetuning data set that includes domain and plan specific data.

Domain finetuned LORA adaptor 314 are LORA adaptors 312 finetuned based on domain specific data. The domain finetuned LORA adaptor 314 are applied 318 to LLM 316 to improve the capability for processing and understanding domain-specific content of the resulting finetuned LLM 320. The domain finetuned LORA adaptor 314 acts as an additional module between layers of the finetuned LLM 320. Parameters of the domain finetuned LORA adaptor 314 can be trained while keeping parameters of the original LLM 316 frozen. This allows finetuned LLM 320 to retain memory of previous tasks while also using only a smaller number of new parameters to learn new tasks, such as understanding healthcare domain-specific content. In some embodiments, multiple adaptors can be used, such that one or more adaptors are for domain finetuned adaptors and others for response-style instruction finetuned adaptors. When multiple adaptors are used, the adaptors are combined by the finetuned LLM 320 during the inference process.

In some embodiments, the finetuned LLM 320 can be used as a merged entity to be subsequently finetuned. This allows for iterative refinement of the model by continually adding new adaptors tailored to specific needs and merging the new finetuned adaptors back to the base model. Additionally, this method facilitates scalability and ongoing enhancement, while also enabling the model to be incrementally finetuned as new requirements emerge.

Additionally or alternatively, multiple adaptors can be developed independently and subsequently integrated into the base model. This modular approach not only allows for targeted improvements specific to each adaptor but also enhances the overall adaptability of the model by combining the strengths of various specialized adaptors.

Figure 4:
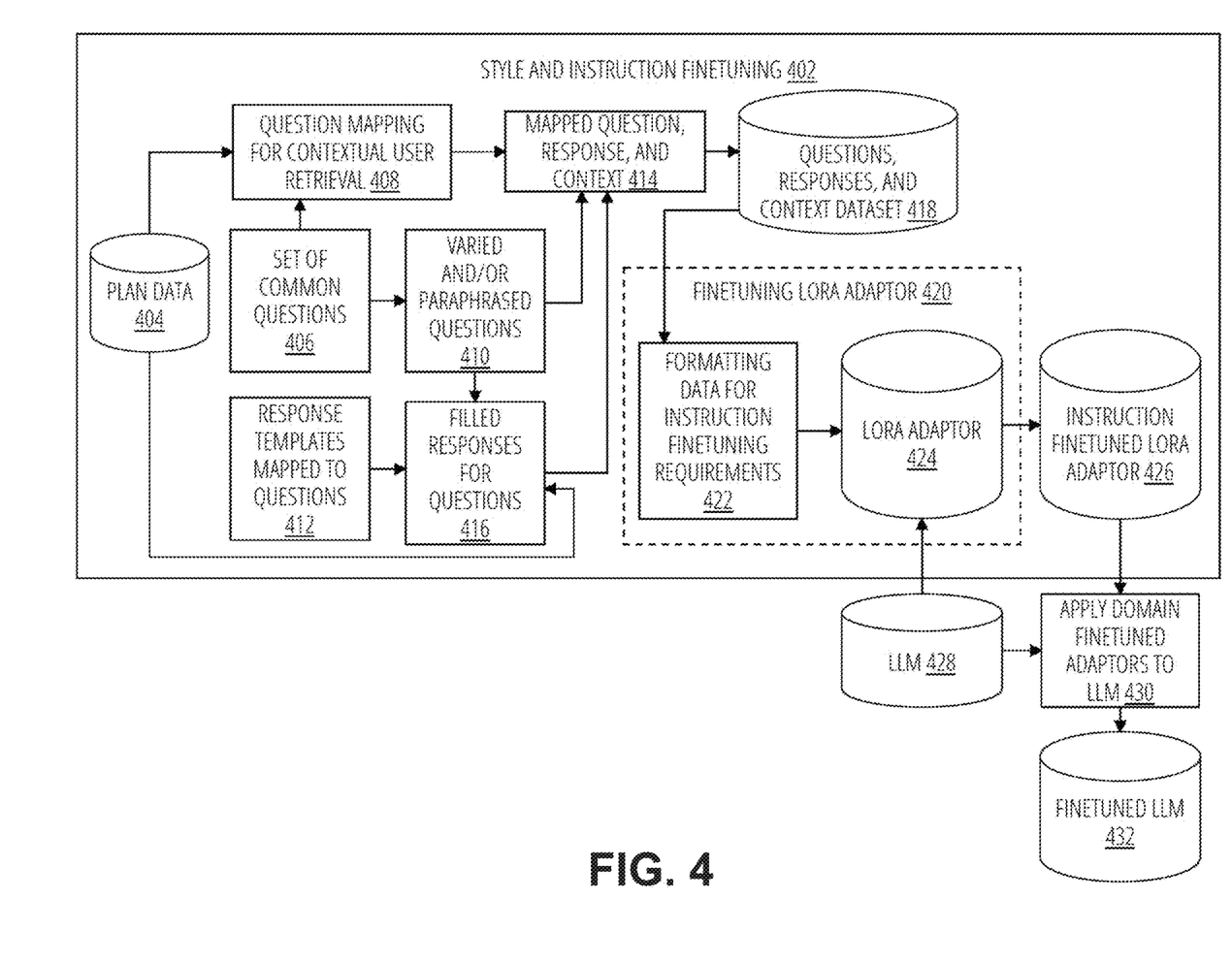
FIG. 4 illustrates example aspects for style and instruction finetuning of an LLM, in accordance with some aspects of the present technology.

FIG. 4 illustrates aspects for style and instruction finetuning 402 of an LLM 428 (e.g., an open source LLM, etc.). Style and instruction finetuning 402 can include a plan data 404, a set of common questions 406, question mapping for contextual user retrieval 408, varied and/or paraphrased questions 410, response templates mapped to questions 412, mapped question, response, and context 414, filled responses for questions 416, questions, responses, and context dataset 418, finetuning LORA adaptor 420, and instruction finetuned LORA adaptor 426. Additionally, the style and instruction finetuning 402 can utilize and apply 430 the instruction finetuned LORA adaptor 426 to the LLM 428 to generate a finetuned LLM 432.

Plan data 404 includes member-specific and plan-specific data. For example, each member can have a particular plan, which includes specific benefits, coverage, costs, etc.

Set of common questions 406 can include a wide variety of questions that users typically query the system. For example, the set of common questions 406 can include questions generated above while generating questions and responses 306.

Question mapping for contextual user retrieval 408 includes mapping questions (e.g., from the set of questions 406, etc.) with contextual user information from specific user plan details (e.g., obtained and/or determined from the plan data 404, and corresponding to the specific user) that can provide contexts based on the question. In some embodiments, data is created for member-specific data that includes contextual information, questions, and/or responses. The contextual information can include factual data used to generate a response during inference. In some embodiments, context information consisting of key-value pairs that are relevant to the user question can be mapped to a particular prompt or question. By finetuning the model using given context, question, and answer, the model can generate more accurate responses during inference time. For example, in some embodiments, the context can be passed to the model through a LangChain process.

In some embodiments, the question mapping for contextual user retrieval 408 can be implemented using retrieval-augmented generation (RAG) and/or using one or more RAG-based techniques. For example, the question mapping for contextual user retrieval 408 can be configured to map questions from the set of questions 406 with corresponding contextual user information (e.g., from the plan data 404), based on using RAG or RAG-based techniques to identify and retrieve the best matching or most approximate contextual plan data 404 information for a given question that is being processing by the question mapping for contextual user retrieval module 408. In one illustrative example, the RAG or RAG-based technique can be implemented using a vector similarity search between a first set of features or embeddings that are generated for the user query (e.g., a question from the set of common questions 406), and a second set of features or embeddings that are generated for the various items of data and information stored within the plan data datastore 404. In some aspects, the plan data datastore 404 can include pre-computed or otherwise pre-determined embeddings that were previously calculated or generated for the various items of data and information stored within the plan data datastore 404. In such examples, the question mapping for contextual user retrieval module 408 can take as input a selection of one or more questions from the set of common questions 406, obtain or generate the corresponding features or embeddings for the selection of questions, and then perform the vector similarity search between the generated question embeddings and the stored embeddings of the plan data within the plan data datastore 404. In some embodiments, the question mapping for contextual user retrieval module 408 can be configured to implement the RAG or RAG-based techniques for mapping the common user questions to corresponding contextual information from the plan data, wherein the RAG or RAG-based techniques use the vector embeddings (e.g., described above) to perform the similarity search and retrieval of identified contextual information from the plan data datastore 404. In another illustrative example, the same (or similar) RAG or RAG-based techniques can be implemented using a graph-based search to identify and retrieve identified contextual information from the plan data datastore 404 for mapping to the common user questions being analyzed by the question mapping for contextual user retrieval module 408.

In another example, the question mapping for contextual user retrieval module 408 can user key word extraction from the user query or question (e.g., included within the set of common questions 406 provided as input to the question mapping for contextual user retrieval module 408). For example, the question mapping for contextual user retrieval module 408 can perform key word extraction from the user question based on one or more named entity recognition (NER) techniques. For example, NER can be performed to recognize various domain-specific proper nouns or other words that are representative of or otherwise strongly associated with a particular entity or object (e.g., a named entity). In some embodiments, the question mapping for contextual user retrieval module 408 can include an NER engine that receives as input an unstructured representation of the text of one or more user questions (e.g., from the set of common questions 406, which may be configured to store the text of the questions in an unstructured form or format). The NER engine can then be used in a process of structuring the various questions included in the set of common questions 406. In particular, the NER engine can be used to locate and classify named entities mentioned or otherwise appearing in the text of the set of common questions 404 into one or more pre-defined categories or classifications. After using the NER engine or NER techniques to perform key words extraction over the user questions of the set of common questions 406, the question mapping for contextual user retrieval module 408 can use the extracted key words (e.g., the recognized named entities from the NER process, etc.) to query the plan data datastore 404 for the presence of those same key words, and/or for plan data information that is associated with or corresponds to an extracted keyword. Based on using the extracted key words from the set of common questions 406, the question mapping for contextual user retrieval module 408 can identify and retrieve relevant chunks or portions of information from the plan data datastore 404 that can be mapped to particular ones of the set of common questions 406 as corresponding contextual information.

In still another example, the question mapping for contextual user retrieval module 408 can utilize an LLM that has been trained on questions (e.g., such as or including the questions from the set of common questions 406, etc.) and cypher queries (e.g., representative or training sample cypher queries that are generated from and correspond to the set of training questions and/or the set of common questions 406, etc.). For example, as described previously with respect to FIG. 1, in some aspects the systems and techniques described herein can utilize one or more LLMs that are trained to generate cypher queries based on and corresponding to the input of a user. In particular, the one or more LLMs may be trained to generate a cypher query representation of a user question or query, wherein the cypher query is configured for interaction with a graph database or other graph-based structure such as a knowledge graph (e.g., knowledge graph 150 of FIG. 1B, various other knowledge graphs stored in the knowledge graph data store 112 of FIG. 1A, etc.). For example, the LLM can be trained on a set of natural language questions/queries and a corresponding cypher query for each respective one of the set of natural language questions/queries. Based on the translation and conversion functionality learned by the LLM, between the natural language query modality and the cypher/graph-structured data query modality, the LLM trained to generate cypher queries from natural language user queries can enable a user or system to interact with graph databases using natural, conversational language. Accordingly, in some embodiments, the question mapping for contextual user retrieval module 408 can utilize an LLM that is trained on questions (corresponding to the style, format, content, etc., of the questions in the set of common questions 406) and cypher queries (corresponding to underlying knowledge graph schema/graph data structure used for the knowledge graph 150 of FIG. 1B and/or the knowledge graphs of the knowledge graph data store 112 of FIG. 1A, etc.) to thereby map the questions from the set of common questions 406 to corresponding cypher queries into the underlying knowledge graph(s) for the plan data 404. Based on translating the set of common questions 406 into cypher queries, the question mapping for contextual user retrieval module 408 can use the generated cypher queries to identify and retrieve the pertinent information from the plan data 404 to load into the context for each question included in the set of common questions 406.

As discussed above, some embodiments may paraphrase the set of common questions 406 to generate varied and/or paraphrased questions 410. For example, in some embodiments, the system, using an LLM model, augments the generated questions and responses by paraphrasing existing questions and responses to generate synthetic data that includes the context, question, and answer, resulting in an even more diverse set of questions and responses. In some embodiments, the generation of paraphrased datasets can be performed using AI-driven application programming interfaces (APIs).

Response templates mapped to questions 412 includes creating templates and mapping the templates to questions to generate mapped question, response, and context 414, which facilitates the generation of filled responses for questions 416. These filled response templates guarantee the standardization of responses across a wide variety of ways of asking the same question. Additionally, the filled responses for questions 416 can include an answer portion and a reason portion. The answer portion includes the actual answer to the question. The reason portion includes the reasoning that connects a given context and a question to arrive at an answer. The reason can be obtained using advanced models given the context, question, and answer. This chain of thought reasoning enhances the model's ability to select the relevant context given a question. During inference, the reason part can be discarded, such that only the answer is provided to the user. The mapped question, response, and context 414 are then stored as a questions, responses, and context dataset 418.

In some embodiments, the style and instruction finetuning 402 can include generating a plurality of mapped question, response, context data instances 414. For example, for each question included in the set of common questions 406 (and/or for some, or all, of the varied and paraphrased questions 410), a corresponding mapped question, response, context data instance 414 can be generated, comprising a question $Q_i$, a corresponding response $R_i$, and a corresponding context information $C_i$. For instance, for each question i included in the set of questions comprising the set of common questions 406 and the set of varied/paraphrased questions 410, the style and instruction finetuning 402 can generate a corresponding mapped question, response, context data instance 414 represented as $\{Q_i, R_i, C_i\}$.

For each mapped question, response, context data instance 414, $Q_i$, represents a particular question, selected from either the set of common questions 406 or the set of varied and/or paraphrased questions 410.

For each mapped question, response, context data instance 414, $R_i$ represents the corresponding response to the particular question $Q_i$. For example, the corresponding response $R_i$ can be obtained from the filled responses for questions 416 (for both common questions 406 and varied/paraphrased questions 410).

For each mapped question, response, context data instance 414, $C_i$ represents the mapped context information determined for the particular question $Q_i$ by the question mapping for contextual user retrieval module 408, as described previously above. For example, the mapped context information $C_i$ can be the portion of plan data 404 that was identified and retrieved by the question mapping module 408 as being the relevant/most relevant contextual information for the particular question $Q_i$.

In one illustrative example, the systems and techniques can be configured to perform an optimization of the retrieved data from the plan data store 404 (e.g., an optimization of the retrieved data that is identified and retrieved from the plan data store 404 by the question mapping module 408, and then used as the mapped context information $C_i$ included in the mapped question, response, context data instance 414 for a particular question $Q_i$).

For instance, the structure of the plan data as stored in the plan data datastore 404 and/or as retrieved by the question mapping module 408 may be different from an expected or optimal format for inputs to the LLM 428 (e.g., which will be used to process the plan data 404 comprising the mapped context information $C_i$ of a given mapped question, response, context data instance 414). Accordingly, in some embodiments, the systems and techniques can be configured to implement one or more context information preparation steps and/or operations to process and adjust the retrieved plan data 404 information into formatted context information $C_i$ for each mapped question, response, context data instance 414. In some cases, the question mapping module 408 can be configured to implement the process of preparing and formatting the context information for the particular LLM model 428 that is being used downstream. For example, the context information data preparation and formatting operations performed by the question mapping module 408 can correspond to an improved ability of the downstream LLM model 428 to deliver accurate and relevant responses. In some aspects, by using the question mapping module 408 to properly modify and structure the retrieved data (e.g., the data retrieved from the plan data datastore 404 by the question mapping module 408 for a particular question) into a properly configured and well-defined format can be seen to significantly enhance the performance of the LLM model 428, for example thereby enabling the LLM model 428 to better interpret and utilize the context information $C_i$ (from the mapped question, response, context data instance(s) 414) more effectively to generate more precise answers as output.

For example, the formatting of the retrieved context information from plan data datastore 404 into the mapped context information $C_i$ 414 can be configured to optimize the performance of the LLM model 428, based on the formatting applied by the question mapping module 408 being designed to present the context information in a structured and clear manner. In one illustrative example, the use of a configured context information formatting step can allow the LLM 428 to more effectively address complex and multi-entity queries, such as addressing queries related to procedure categories that encompass multiple procedures codes, etc.

In one illustrative example, presented below is an example of raw retrieved data in a format provided to the question mapping module 408 by the plan data datastore 404 (e.g., the example raw retrieved data below can be the data that is identified and retrieved by the question mapping module 408 from the plan data datastore 404 during the contextual user information mapping process performed for each question of the set of common questions 406, etc.):

["{'payment frequency for adjustments': 'quarterly', 'Plan Frequency (allowed frequency as per plan)': 'Every 2 years on same tooth', 'Remaining Frequency (utilized)': 'No service utilized, Two services remaining', 'Conditions on frequency on same date or time interval': 'Not applicable or no information available', 'down payment':", 'Procedure code': 'D7410', 'common phrases used to refer to the procedure code': 'gold crown, Preventive'}","{'payment frequency for adjustments': 'Quarterly', 'Plan Frequency (allowed frequency as per plan)': 'Every 2 years on same tooth', 'Remaining Frequency (utilized)': 'No service utilized, Two services remaining', 'Conditions on frequency on same date or time interval': 'Not applicable or no information available', 'down payment': 'Not applicable or no information available', 'Procedure code': 'D6115', 'common phrases used to refer to the procedure code': 'silver filling, Preventive'}","{'payment frequency for adjustments': 'Quarterly', 'Plan Frequency (allowed frequency as per plan)': 'Once every 3 years', 'Remaining Frequency (utilized)': 'One service utilized, One remaining', 'Conditions on frequency on same date or time interval':", 'down payment':", 'Procedure code': 'D7140', 'common phrases used to refer to the procedure code': 'temporary crown, Preventive'}","{'payment frequency for adjustments': 'weekly', 'Plan Frequency (allowed frequency as per plan)': 'Every 3 years', 'Remaining Frequency (utilized)': 'Not applicable or no information available', 'Conditions on frequency on same date or time interval':", 'down payment':", 'Procedure code': 'D9430', 'common phrases used to refer to the procedure code': 'porcelain fused to gold, crown, Preventive'}"]

In some embodiments, the question mapping module 408 can be configured to perform one or more data processing, data cleaning, and/or data formatting operations to generate formatted context information from the raw retrieved data obtained from the plan data datastore 404. For example, the raw retrieved data of the example above can be processed by the question mapping module 408, according to a configured context information data format and/or according to one or more configure context information data formatting rules, to thereby generate the formatted context information presented in the example below:

For Procedure Category: Filling
    Payment Frequency for Adjustments: Quarterly.
    Procedure Codes (or Treatments) Usable on Same Date of Service: Not applicable or no information available
    Remaining Frequency (Utilized):
        For D7410: No service utilized, Two services remaining
        For D6115: No service utilized, Two services remaining
        For D7140: One service utilized, One remaining Advantageously, configuring and using the question mapping module 408 to generate formatted context information for output and use as the mapped context information $C_i$ that is included in the mapped question, response, context data instance 414 (and that is subsequently used by the downstream LLM 428) can be seen to effectively condense and simplify the raw data from its retrieved format from the plan data datastore 404, to the configured context information format shown in the example above, where relevant context information and corresponding data entries are condensed and streamlined into easily identifiable single entries that can be better used by the LLM 428 for contextualization during inference. For example, the 'Payment Frequency for Adjustments' information is streamlined into a single entry within the formatted context information when it is consistent across all codes within the 'Filling' category. In the example of the formatted context information provided above, the 'Remaining Frequency (Utilized)' is enumerated separately for each code (e.g., separately enumerated for the three codes D7410, D6115, and D7140) based on the question mapping module 408 determining that varying values are present within the raw retrieved data from plan data datastore 404 for the 'Remaining Frequency (Utilized)' field. In some aspects, by configuring the question mapping module 408 to perform formatting and structuring of the mapped context information $C_i$ generated as output by the question mapping module 408, the LLM 428 receives as input and operates on (e.g., processes, etc.) only the relevant context information for a given question. For instance, the formatted context information structure used for the outputs of context information $C_i$ from the question mapping module 408 can be used for compressing and structure the context information plan data to allow the LLM 428 to more easily process and interpret the context information that is represented within the raw retrieved plan data 404, which can lead to or enable more accurate and contextually relevant responses being generated as output by the LLM 428. In some embodiments, the structured approach of using the question mapping module 408 to generate the formatted mapped context information as output can additionally be seen to facilitate efficient data retrieval from the plan data datastore 404, and to additionally enhance the LLM 428 ability to provide precise and coherent answers.

Finetuning LORA adaptor 420 can include formatting data 422 and a datastore of LORA adaptors 424. Formatting data 422 includes formatting data according to specific requirements for instruction finetuning to generate instruction finetuned LORA adaptors 426 from LORA adaptors 424. For example, this can involve structuring the data to align with the prompting format of the selected LLM being finetuned. In some embodiments, this can be one single finetuned adaptor made on an entire finetuning data set that includes response-style-instructions data.

Instruction finetuned LORA adaptor 426 are LORA adaptors 424 finetuned based on plan specific data, style, and instructions. The instruction finetuned LORA adaptor 426 are applied LLM 428 to improve the capability for enable the resulting finetuned LLM 432 to provide answers to questions, while also adhering to specific stylistic and instructional guidelines (e.g., to provide a human-like response). The domain finetuned LORA adaptor 426 acts as an additional module between layers of the finetuned LLM 432. Parameters of the domain finetuned LORA adaptor 426 can be trained while keeping parameters of the original LLM 428 frozen. This allows finetuned LLM 432 to retain memory of previous tasks while also using only a smaller number of new parameters to learn new tasks, such as understanding healthcare domain-specific content. As discussed above multiple adaptors can be used, such that one or more adaptors are for response-style instruction finetuned adaptors and others for domain finetuned adaptors. When multiple adaptors are used, the adaptors are combined by the finetuned LLM 432 during the inference process.

Figure 5:
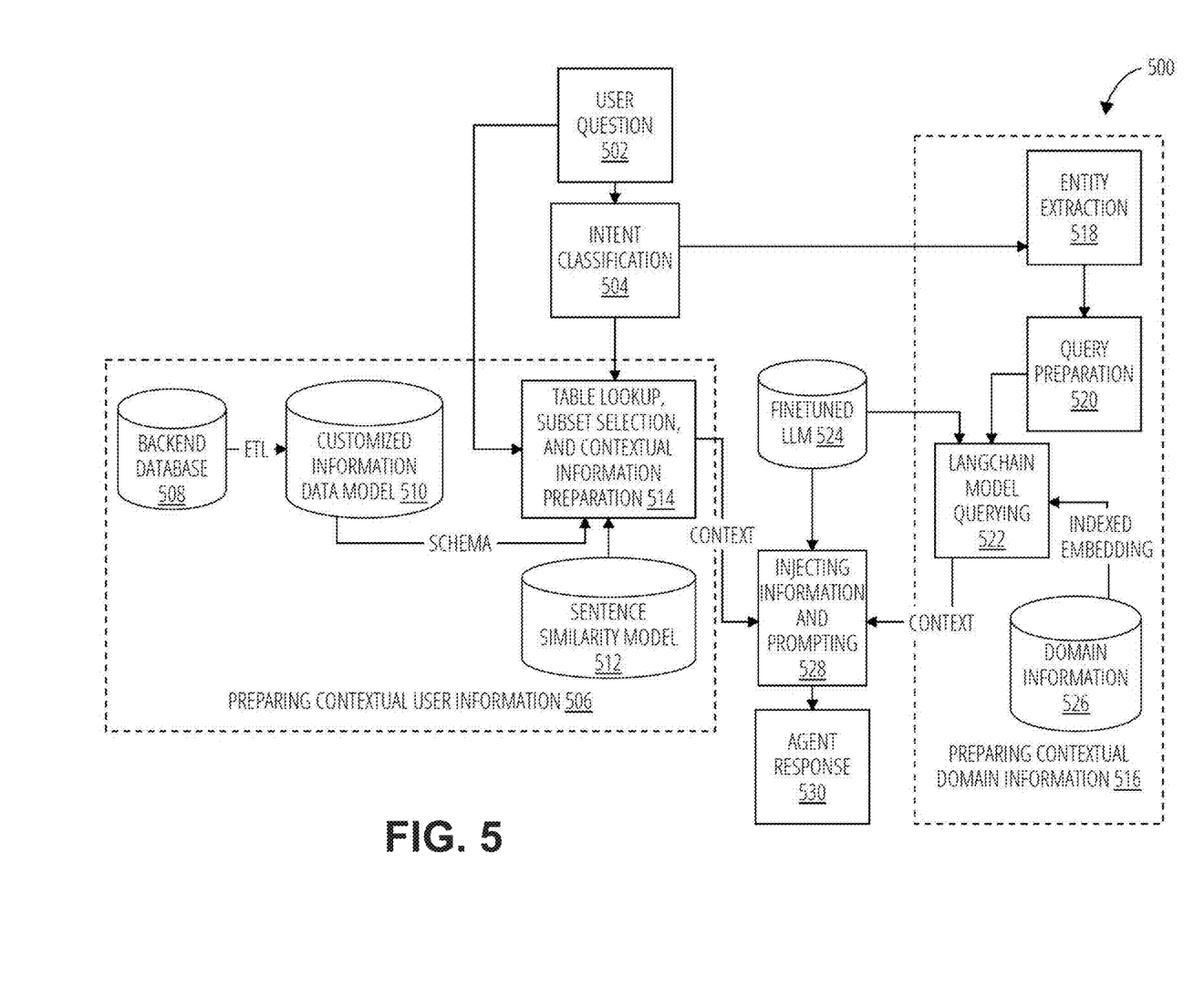
FIG. 5 illustrates an example inference pipeline for answering a user question, in accordance with some aspects of the present technology.

FIG. 5 illustrates an inference pipeline 500 for answering a user question 502. The inference pipeline 500 can include various processes and modules including intent classification 504, preparing contextual user information 506, preparing contextual domain information 516, and injecting information and prompting 528 of a finetuned LLM 524 to generate an agent response 530.

After receiving user question 502, the conversational AI agent system can perform intent classification 504 by interpreting the user question 502, identifying an intent, and classifying the intent into a pre-defined category. The classified intent is then provided to various other processes and/or modules downstream. In some aspects, the intent classification 504 of FIG. 5 may be the same as or similar to the intent classification of the intent classification and routing 106 of FIG. 1A. For example, intent classification 504 can be performed using one or more AI and/or ML intent classification models or classifiers that are trained to classify an input comprising one or more user questions into a corresponding one or more categories/classifications that are included in a plurality of pre-defined or otherwise configured categories/classifications into which a user question may be classified. For instance, as noted previously, the conversational AI agent system and the intent classification engine 504 can utilize natural language processing techniques and AI/ML models to accurately determine user intent information for a received user query, such that the determined user intent information can subsequently be used to guide the query's routing to the appropriate response mechanisms or LLMs implemented or accessed by the conversational AI agent system. In some embodiments, the intent classification 504 can be trained with a comprehensive set of phrases covering a wide array of potential user queries, enabling the system to classify intents more effectively and respond accurately across various user interactions. For example, the phrases can be historical phrases previously asked to live agents. In some examples, the phrases can be asked to previous iterations of the conversational AI agent system (e.g., continued training, etc.).

Preparing contextual user information 506 can include a backend database 508 that can have extract, transform, load (ETL) routines employed to process and transform the data for use during inference. For example, backend database 508 can have ETL routines performed to generate customized information data model 510. For example, data from backend database 508 can be systematically transformed and loaded into intermediary views or tables, which help in the creation of the customized information data model 510. Additionally, relevant tables can be looked up based on the classified intent and a subset of columns can be selected using a similarity classifier to create a subset of contextual information relevant to the question.

Customized information data model 510 is customized to suit the specific needs of the health insurance domain, which ensures that data retrieval and manipulation are optimized for quick response generation. In some embodiments, the customized information data model 510 is an intermediary data store that structures complex and diverse data in a format that is readily accessible and actionable by the finetuned LLM 524. In some embodiments, the customized information data model 510 can have key names and corresponding values that are designed to align closely with natural language expressions commonly used in the domain of healthcare. This can ensure that when the AI retrieves data, it can leverage these phrases directly in its responses, making the interactions appear more natural and intuitive to the end user. For example, a user may ask "are wisdom teeth covered under plan 2930?" The conversational AI agent system can use the schema of customized information data model 510 to identify benefits associated with "wisdom teeth" queries under the user plan. As the question concerns dental coverage, specifically teeth related, only teeth coverage information is retrieved for the requested procedure code.

Sentence similarity model 512 can be used to filter and retrieve specific data based on the query. This also allows the AI to identify and extract only the most relevant data points from customized information data model 510 based on the real-time analysis of user questions, which improves accuracy and the contextual appropriateness of the responses.

Table lookup, subset selection, and contextual information preparation 514 includes searching through the tables of backend database 508 and/or customized information data model 510. In some embodiments, a subset of columns can be selected using a similarity classifier to create a subset of contextual user information relevant to the question.

Referring back to the intent classification 504 above, the classified intent is used during entity extraction 518 to determine relevant entities. For example, a user may ask "are wisdom teeth covered under plan 2930?" The conversational AI agent system can use the schema of customized information data model 510 to identify the relevant procedure code for "wisdom teeth" queries subscribed under the user plan.

The relevant entities are then used for query preparation 520. For example, a prepared query may be "are wisdom teeth primary?" The prepared query is then provided to a LangChain model.

Finetuned LLM 524 can have a LangChain model querying 522 indexed embeddings from domain information 526 to generate contextual domain information.

The contextual user information selected above during table lookup, subset selection, and contextual information preparation 514 and the contextual domain information generated after LangChain model querying 522 can be injected into a prompt to ensure that the LLM model has the necessary context to generate an accurate and relevant response. The finetuned LLM 524 is then prompted with the contextual user information and the contextual information to generate an agent response 530 that is accurate, relevant, and natural sounding.

Figure 6:
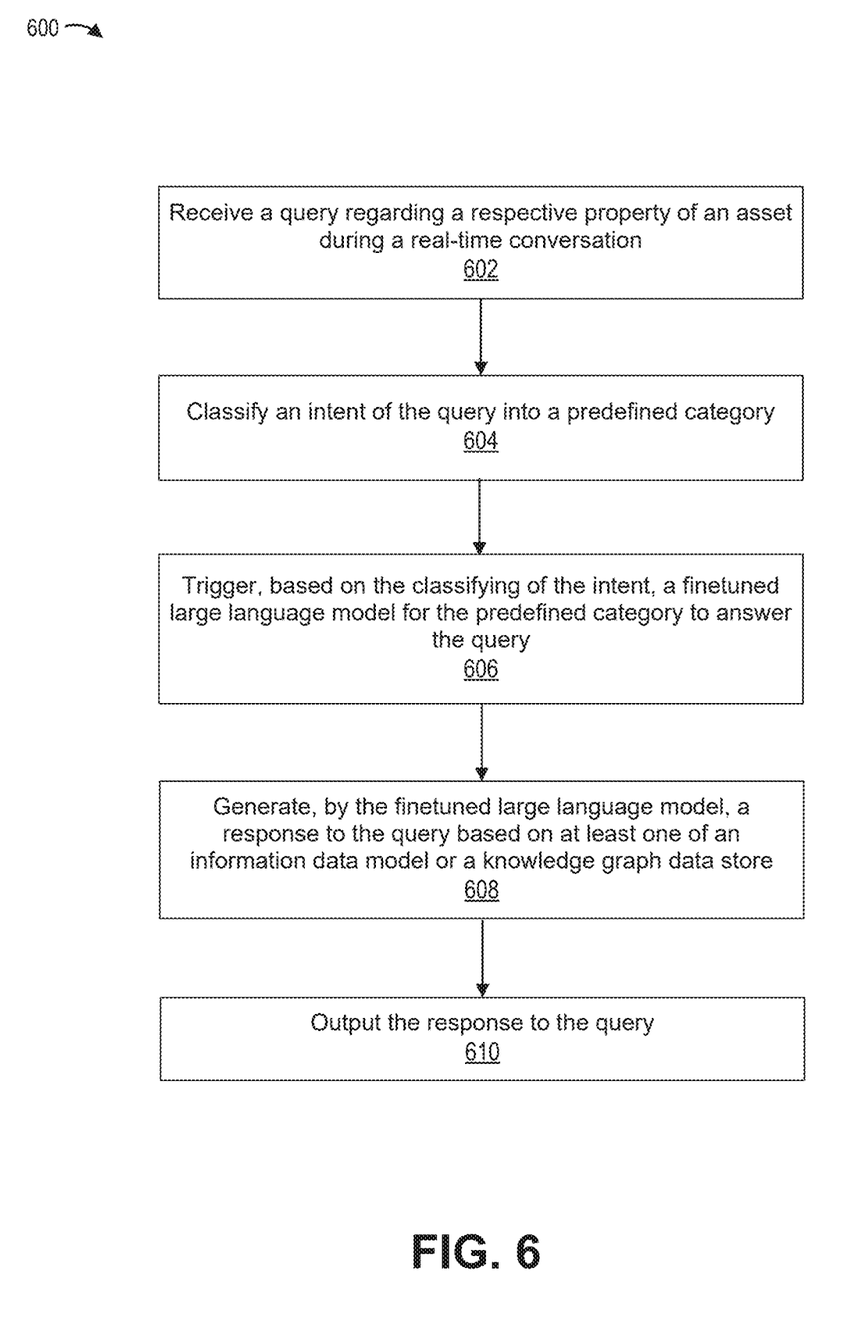
FIG. 6 illustrates an example method for providing enhanced user interactions in contact centers using an artificial intelligence (AI) conversational agent, in accordance with some aspects of the present technology.

FIG. 6 illustrates an example method 600 for providing enhanced user interactions in contact centers (e.g., in the healthcare domain) using an artificial intelligence (AI) conversational agent configured for enhanced user interaction in multi-channel contact centers. Although the example method 600 depicts a particular sequence of operations, the sequence may be altered without departing from the scope of the present disclosure. For example, some of the operations depicted may be performed in parallel or in a different sequence that does not materially affect the function of the method 600. In other examples, different components of an example device or system that implements the method 600 may perform functions at substantially the same time or in a specific sequence.

In block 602, method 600 can include receiving a query regarding a respective property of an asset during a real-time conversation.

In block 604, method 600 can include classifying an intent of the query into a predefined category.

In block 606, method 600 can include triggering, based on the classifying of the intent, a finetuned large language model for the predefined category to answer the query. In some embodiments, the finetuned large language model is a merged model finetuned based on domain data collection, and the merged model is further finetuned based on contextual data including member-specific plans.

In block 608, method 600 can include generating, by the finetuned large language model, a response to the query based on at least one of an information data model and a knowledge graph data store. In some embodiments, the information data model is an intermediary layer that structures and standardizes data from a plurality of sources prior to being processed by a machine learning model. In some embodiments, the knowledge graph data store organizes data sets using a network of linked data entities and relationships by a domain-specific ontology. In some embodiments, generating the response includes inputting a prompt generated based on the intent into the finetuned large language model, receiving data from the at least one of the information data model and the knowledge graph data store, and generating the response as a results augmented generation based on the data received.

In some embodiments, method 600 can include determining a communication method that the query is received through. In some embodiments, the response is generated conditionally based on the communication method.

In block 610, method 600 can include outputting the response to the query. For example, the response can be outputted during the real-time conversation and/or using an appropriate communication method (e.g., a communication method that the query was received through).

In some embodiments, method 600 can include determining that a handover to a live agent is needed, generating a summary of the real-time conversation, and providing the summary to the live agent.

Figure 7:
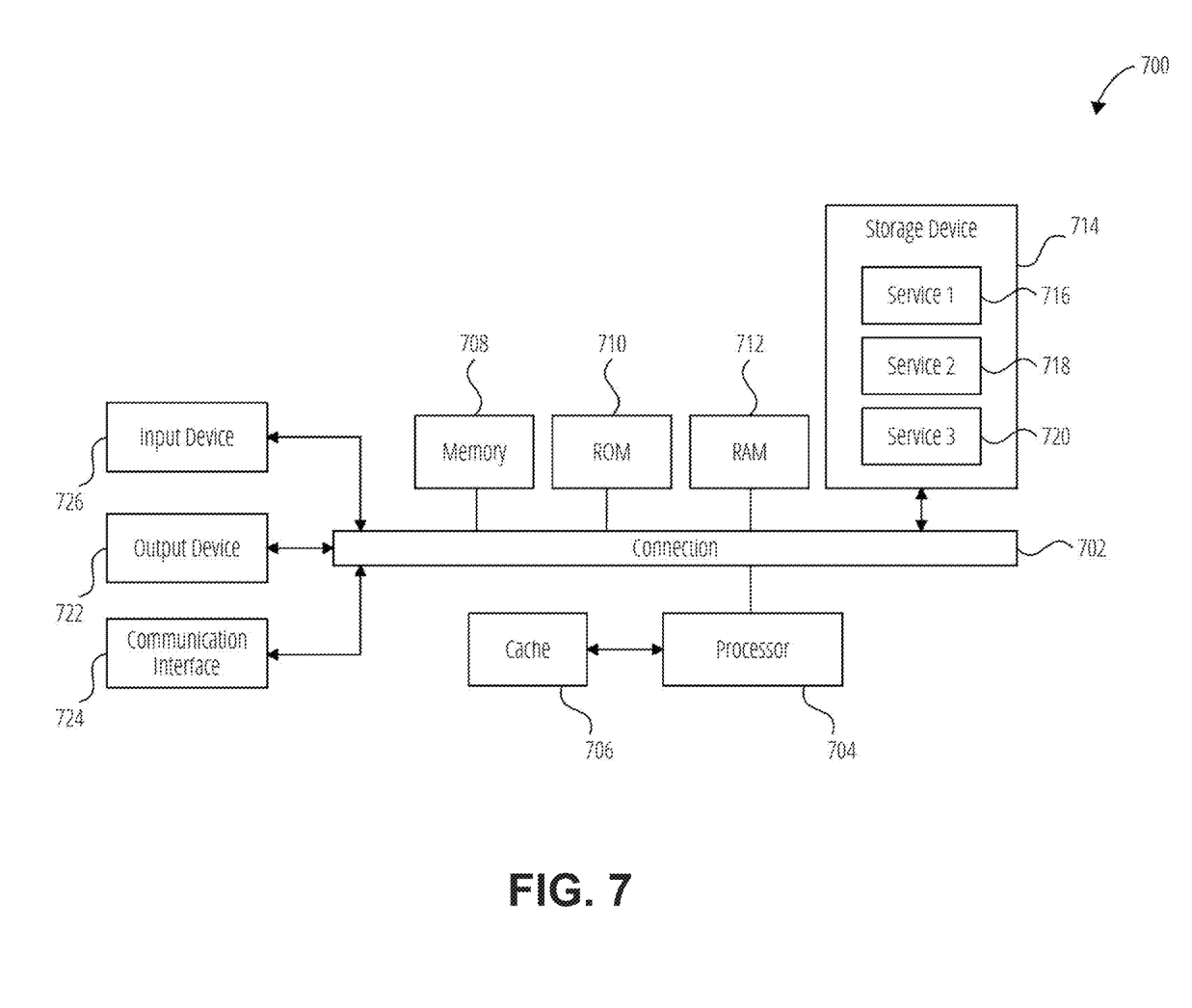
FIG. 7 shows an example of a system for implementing certain aspects of the present technology.

FIG. 7 shows an example of computing system 700, which can be for example any computing device making up conversational AI agent system 104, virtual agent 210, insurance domain data 304, domain finetuned LORA adaptor 314, LLM 316, finetuned LLM 320, plan data 404, questions, responses, and context dataset 418, instruction finetuned LORA adaptor 426, LLM 428, finetuned LLM 432, backend database 508, customized information data model 510, sentence similarity model 512, finetuned LLM 524, domain information 526, or any component thereof in which the components of the system are in communication with each other using connection 702. Connection 702 can be a physical connection via a bus, or a direct connection into processor 704, such as in a chipset architecture. Connection 702 can also be a virtual connection, networked connection, or logical connection.

In some embodiments, computing system 700 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example computing system 700 includes at least one processing unit (CPU or processor) 704 and connection 702 that couples various system components including system memory 708, such as read-only memory (ROM) 710 and random access memory (RAM) 712 to processor 704. Computing system 700 can include a cache of high-speed memory 706 connected directly with, in close proximity to, or integrated as part of processor 704.

Processor 704 can include any general purpose processor and a hardware service or software service, such as services 716, 718, and 720 stored in storage device 714, configured to control processor 704 as well as a special-purpose processor where software instructions are incorporated into the actual processor design. Processor 704 may essentially be a completely self-contained computing system, containing multiple cores or processors, a bus, memory controller, cache, etc. A multi-core processor may be symmetric or asymmetric.

To enable user interaction, computing system 700 includes an input device 726, which can represent any number of input mechanisms, such as a microphone for speech, a touch-sensitive screen for gesture or graphical input, keyboard, mouse, motion input, speech, etc. Computing system 700 can also include output device 722, which can be one or more of a number of output mechanisms known to those of skill in the art. In some instances, multimodal systems can enable a user to provide multiple types of input/output to communicate with computing system 700. Computing system 700 can include communication interface 724, which can generally govern and manage the user input and system output. There is no restriction on operating on any particular hardware arrangement, and therefore the basic features here may easily be substituted for improved hardware or firmware arrangements as they are developed.

Storage device 714 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 714 can include software services, servers, services, etc., that when the code that defines such software is executed by the processor 704, it causes the system to perform a function. In some embodiments, a hardware service that performs a particular function can include the software component stored in a computer-readable medium in connection with the necessary hardware components, such as processor 704, connection 702, output device 722, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

What is claimed is:

1. A method comprising:
   receiving a query regarding a respective property of a dental healthcare plan, wherein the respective property corresponds to user-specific information for the dental healthcare plan and a user, and wherein the query comprises a natural language query received during a real-time conversation with the user by a virtual conversational agent system;
   classifying an intent of the query into a predefined category of a plurality of predefined categories included in a domain-specific ontology associated with the dental healthcare plan;

triggering, based on the classifying of the intent, a selected finetuned large language model (LLM) for the predefined category to answer the query, wherein the selected finetuned LLM has been domain-finetuned corresponding to the predefined category and the domain-specific ontology, and wherein the selected finetuned LLM is selected from a plurality of finetuned LLMs each having been domain-finetuned for a different category of the plurality of predefined categories;

generating, using an additional LLM trained on a graph-structured data query modality, a cypher query representation of the natural language query;

obtaining contextual information based executing the cypher query representation against a knowledge graph data store including contextual data of the dental healthcare plan stored according to the graph-structured data query modality, wherein the contextual user information includes at least a portion of the user-specific information for the dental healthcare plan;

generating, by the selected finetuned LLM, a response to the query based on an information data model and the knowledge graph data store, wherein generating the response includes injecting the contextual user information into a prompt for the query provided to the selected finetuned LLM; and outputting the response to the query, based on using the selected finetuned LLM to process the prompt with the contextual user information and the query.

2. The method of claim 1, further comprising:
determining that a handover to a live agent is needed; and generating a summary of the real-time conversation.

3. The method of claim 1, wherein the information data model is an intermediary layer that structures and standardizes data from a plurality of sources prior to being processed by a machine learning model.

4. The method of claim 1, wherein the knowledge graph data store organizes data sets using a network of linked data entities and relationships by a domain-specific ontology.

5. The method of claim 1, further comprising:
determining a communication modality associated with receiving the query; and
wherein generating the response includes performing conditional generation of the response based on the determined communication modality.

6. The method of claim 1, wherein the finetuned large language model is a merged model finetuned based on domain data collection, and wherein the merged model is further finetuned based on contextual data including member-specific plans.

7. The method of claim 1, wherein generating the response includes:
inputting a prompt generated based on the intent into the finetuned large language model;
receiving data from the at least one of the information data model or the knowledge graph data store; and
generating the response as a result of an augmented generation performed based on the received data.

8. A non-transitory computer-readable medium storing instructions thereon, wherein the instructions, when executed by one or more processors, cause the one or more processors to perform operations comprising:
receiving a query regarding a respective property of a dental healthcare plan, wherein the respective property corresponds to user-specific information for the dental healthcare plan and a user, and wherein the query comprises a natural language query received during a real-time conversation with the user by a virtual conversational agent system;

classifying an intent of the query into a predefined category of a plurality of predefined categories included in a domain-specific ontology associated with the dental healthcare plan;

triggering, based on the classifying of the intent, a selected finetuned large language model (LLM) for the predefined category to answer the query, wherein the selected finetuned LLM has been domain-finetuned corresponding to the predefined category and the domain-specific ontology, and wherein the selected finetuned LLM is selected from a plurality of finetuned LLMs each having been domain-finetuned for a different category of the plurality of predefined categories;

generating, using an additional LLM trained on a graph-structured data query modality, a cypher query representation of the natural language query;

obtaining contextual information based executing the cypher query representation against a knowledge graph data store including contextual data of the dental healthcare plan stored according to the graph-structured data query modality, wherein the contextual user information includes at least a portion of the user-specific information for the dental healthcare plan;

generating, by the selected finetuned LLM, a response to the query based on an information data model and the knowledge graph data store, wherein generating the response includes injecting the contextual user information into a prompt for the query provided to the selected finetuned LLM; and outputting the response to the query, based on using the selected finetuned LLM to process the prompt with the contextual user information and the query.

9. The non-transitory computer-readable medium of claim 8, wherein the instructions, when executed by the one or more processors, further cause the one or more processors to perform operations comprising:
determining that a handover to a live agent is needed; and generating a summary of the real-time conversation.

10. The non-transitory computer-readable medium of claim 8, wherein the information data model is an intermediary layer that structures and standardizes data from a plurality of sources prior to being processed by a machine learning model.

11. The non-transitory computer-readable medium of claim 8, wherein the knowledge graph data store organizes data sets using a network of linked data entities and relationships by a domain-specific ontology.

12. The non-transitory computer-readable medium of claim 8, wherein the instructions, when executed by the one or more processors, further cause the one or more processors to perform operations comprising:
determining a communication modality associated with receiving the query; and
wherein generating the response includes performing conditional generation of the response based on the determined communication modality.

13. The non-transitory computer-readable medium of claim 8, wherein the finetuned large language model is a merged model finetuned based on domain data collection, and wherein the merged model is further finetuned based on contextual data including member-specific plans.

14. The non-transitory computer-readable medium of claim 8, wherein, to generate the response, the instructions cause the one or more processors to perform operations comprising:

inputting a prompt generated based on the intent into the finetuned large language model;
   receiving data from the at least one of the information data model or the knowledge graph data store; and
   generating the response as a result of an augmented generation performed based on the received data.

15. A system comprising:

a processor; and
   a non-transitory memory storing computer-executable instructions thereon, wherein the computer-executable instructions, when executed by the processor, cause the processor to perform operations comprising:
      receiving a query regarding a respective property of a dental healthcare plan, wherein the respective property corresponds to user-specific information for the dental healthcare plan and a user, and wherein the query comprises a natural language query received during a real-time conversation with the user by a virtual conversational agent system;
      classifying an intent of the query into a predefined category of a plurality of predefined categories included in a domain-specific ontology associated with the dental healthcare plan;
      triggering, based on the classifying of the intent, a selected finetuned large language model (LLM) for the predefined category to answer the query, wherein the selected finetuned LLM has been domain-finetuned corresponding to the predefined category and the domain-specific ontology, and wherein the selected finetuned LLM is selected from a plurality of finetuned LLMs each having been domain-finetuned for a different category of the plurality of predefined categories;
      generating, using an additional LLM trained on a graph-structured data query modality, a cypher query representation of the natural language query;
      obtaining contextual information based executing the cypher query representation against a knowledge graph data store including contextual data of the dental healthcare plan stored according to the graph-structured data query modality, wherein the contextual user information includes at least a portion of the user-specific information for the dental healthcare plan;
      generating, by the selected finetuned LLM, a response to the query based on an information data model and the knowledge graph data store, wherein generating the response includes injecting the contextual user information into a prompt for the query provided to the selected finetuned LLM; and
      outputting the response to the query, based on using the selected finetuned LLM to process the prompt with the contextual user information and the query.

16. The system of claim 15, wherein the computer-executable instructions, when executed by the processor, cause the processor to further perform operations comprising:

determining that a handover to a live agent is needed; and
   generating a summary of the real-time conversation.

17. The system of claim 15, wherein the information data model is an intermediary layer that structures and standardizes data from a plurality of sources prior to being processed by a machine learning model.

18. The system of claim 15, wherein the knowledge graph data store organizes data sets using a network of linked data entities and relationships by a domain-specific ontology.

19. The system of claim 15, wherein the instructions, when executed by the processor, further cause the one or more processor to perform operations comprising:

determining a communication modality associated with receiving the query; and
   wherein generating the response includes performing conditional generation of the response based on the determined communication modality.

20. The system of claim 15, wherein the finetuned large language model is a merged model finetuned based on domain data collection, and wherein the merged model is further finetuned based on contextual data including member-specific plans.

* * * * *